United States Patent [19]
Frank et al.

[11] 4,451,509
[45] May 29, 1984

[54] RADIATION-HARDENABLE AQUEOUS BINDER EMULSIONS OF ACRYLATE PREPOLYMER WITH UNSATURATED POLYESTER EMULSIFIER HAVING BENZYLOXY AND ALKYLENE-OXY GROUPS

[75] Inventors: Walter Frank, Rain/Lech; Otto Bendszus, Krefeld; Jürgen Meixner, Krefeld; Hans J. Freier, Krefeld; Hans-Joachim Traenckner, Krefeld, all of Fed. Rep. of Germany

[73] Assignee: Bayer Aktiengesellschaft, Leverkusen, Fed. Rep. of Germany

[21] Appl. No.: 455,222

[22] Filed: Jan. 3, 1983

[30] Foreign Application Priority Data

Jan. 14, 1982 [DE] Fed. Rep. of Germany ....... 3200907

[51] Int. Cl.$^3$ .......................... C08F 2/50; B05D 3/06; B32B 27/40
[52] U.S. Cl. .............................. 427/54.1; 204/159.15; 204/159.16; 204/159.19; 204/159.23; 428/425.1; 523/501; 525/444; 525/921; 528/300
[58] Field of Search .................... 427/54.1; 428/425.1, 428/159.16; 204/159.15, 159.19, 159.23

[56] References Cited

U.S. PATENT DOCUMENTS

| | | | |
|---|---|---|---|
| 3,442,842 | 5/1969 | Von Bonin | 525/438 |
| 3,864,133 | 2/1975 | Hisamatsu et al. | 204/159.15 |
| 3,891,523 | 6/1975 | Hisamatsu et al. | 204/159.15 |
| 3,997,511 | 12/1976 | Batzer et al. | 260/DIG. 24 |
| 4,021,506 | 5/1977 | Batzer et al. | 260/DIG. 24 |
| 4,107,012 | 8/1978 | Fuhr et al. | 204/159.19 |
| 4,125,503 | 11/1978 | McCarty et al. | 204/159.16 |
| 4,180,474 | 12/1979 | Schuster et al. | 204/159.19 |
| 4,281,068 | 7/1981 | Frank et al. | 521/62 |
| 4,287,039 | 9/1981 | Buethe et al. | 204/159.19 |
| 4,339,566 | 7/1982 | Rosenkranz et al. | 204/159.14 |
| 4,383,902 | 5/1983 | Frank et al. | 204/159.15 |
| 4,389,472 | 6/1983 | Neuhaus et al. | 428/203 |

FOREIGN PATENT DOCUMENTS 1024654 2/1958 Fed. Rep. of Germany .

Primary Examiner—John C. Bleutge
Assistant Examiner—A. H. Koeckert
Attorney, Agent, or Firm—Connolly and Hutz

[57] ABSTRACT

This invention relates to aqueous, radiation-hardenable emulsions produced from mixtures of the following:
 (A) from 90 to 50%, by weight, of at least one acrylate prepolymer, containing, per 100 g, from 0.2 to 0.65 mols of (meth)acryloyloxy groups and having a viscosity of from 500 to 300,000 mPa.s, measured at 20° C.;
 (B) from 10 to 50%, by weight, of at least one emulsifier polyester having a viscosity of from 2,000 to 200,000 mPa.s, containing, per 100 g:
  (1) from 0.06 to 0.28 mols of condensed units of an α-β-mono-olefinically unsaturated dicarboxylic acid;
  (2) from 0.04 to 0.34 mols of benzyloxy groups; and
  (3) from 30 to 80%, by weight, based on emulsifier polyester, of alkylene-oxy groups (-alkylene-O-);
the sum of (A) and (B) amounting to 100%,
 (C) from 25 to 400%, by weight, of water; and
 (D) from 0 to 10%, by weight, of at least one conventional photoinitiator;
the percentage contents of (C) and (D) being based on the sum of (A) and (B). The emulsions are used in particular for coating wood and wood-like materials.

4 Claims, No Drawings

RADIATION-HARDENABLE AQUEOUS BINDER EMULSIONS OF ACRYLATE PREPOLYMER WITH UNSATURATED POLYESTER EMULSIFIER HAVING BENZYLOXY AND ALKYLENE-OXY GROUPS

This invention relates to radiation-hardenable, aqueous binder emulsions based on a mixture of radiation-hardenable prepolymers containing (meth)acryloyloxy groups, and radiation-hardenable, copolymerisable, unsaturated polyesters as emulsifiers which may be incorporated in the copolymer. The emulsions are preferably used for coating wood and wood-like materials, for example veneer-imitation films.

A large number of aqueous dispersions based on (meth)acrylate prepolymers of a different composition are known. Anionic aqueous dispersions are mainly described, which are obtained by the neutralisation of prepolymers containing carboxyl groups, possibly with the addition of a solvent (see Lackkunstharze, H. Wagner and H. F. Sarx, Carl Hanser Verlag 1971, P. 235). Dispersions of this type have the disadvantage that the neutralising agents, such as alkalis and amines, accelerate the saponification of the condensed binders containing ester groups. Furthermore, the neutralising agents remain to some extent in the lacquer film and, consequently, the water resistance of the film decreases and the amine residues may cause a yellowing effect. The proportion of solvent which may be present is detrimental to the environment during the drying process.

German Offenlegungsschrift No. 2,853,921 (=U.S. Pat. No. 4,287,039) discloses the production of radiation-hardenable, aqueous binder dispersions based on prepolymers containing C-C double bonds, in which polyvinyl alcohol and/or vinyl pyrrolidone-vinyl ester copolymers, always having residual contents of vinyl acetate or vinyl esters are used as the dispersing agent. The aqueous dispersions are produced in the presence of solvents. A disadvantage of this process is the considerable expense of dispersion due to distilling off the solvent after dispersing. Furthermore, due to the high molecular weight of these dispersing agents, they tend to form films and "stalactites" when the dispersion is applied to points of the application machines which are particularly exposed due to a draught. They may only be re-solubilized with very great difficulty and often obstruct the application until it has to be discontinued.

German Offenlegungsschrift No. 2,936,039 (=U.S. patent application Ser. No. 183,076, filed Sept. 2, 1980, now U.S. Pat. No. 4,339,566, relates to radiation-hardenable, aqueous dispersions based on urethane acrylates which contain incorporated sulphonic acid groups, thus allowing dispersion in water. However, for easier handling, the dispersions are prepared in the presence of up to 30%, by weight, based on urethane acrylate, of solvents which should be removed before hardening. In the case of higher contents of sulphonic acid groups in the hardened products, the water-sensitivity is also increased. Due to the relatively high viscosity of the dispersions, they are only suitable to a limited extent for the casting apparatus used for coating wood.

Furthermore, aqueous emulsions of mixtures of unsaturated polyesters are known from German Offenlegungsschrift No. 2,804,216 (=U.S. Pat. No. 4,281,068), which are used as air-drying coating agents for wood and wood-like materials. At least one of the unsaturated polyesters is used as an emulsifying agent which may be incorporated. It contains condensed therein alkylene-oxy radicals (-alkylene-O-) and allyloxy groups. Emulsifier polyesters of this type are unsuitable for emulsifying prepolymers containing (meth)acryloyloxy groups, because after a short time, they cause, inter alia, gelatinisation of the mixture.

An object of the present invention is to provide aqueous, radiation-hardenable binder emulsions which are free from reactive diluents and are based on prepolymers having (meth)acryloyloxy groups and which obtain a stable oil-in-water structure due to the emulsifier, as a result of which, they may also be applied using casting machines which are conventional for coating furniture, and in which the emulsifier is incorporated in the polymer by copolymerisation during radiation hardening.

This object is achieved by using non-ionically active emulsifier polyesters to emulsify the prepolymers containing (meth)acryloyloxy groups (=acrylate prepolymers), which polyesters copolymerise with the acrylate prepolymer via incorporated units of $\alpha$-$\beta$-mono-olefinically unsaturated dicarboxylic acids, and the polyol moiety of which contains alkyleneoxy-(-alkylene-O-) and benzyloxy groups.

Thus, the present invention provides aqueous radiation-hardenable emulsions produced from mixtures of the following:

(A) from 90 to 50%, by weight, preferably from 90 to 70%, by weight, of at least one acrylate prepolymer, containing, per 100 g, from 0.2 to 0.65 mols, preferably from 0.3 to 0.55 mols, of (meth)acryloyloxy groups and having a viscosity of from 500 to 300,000 mPas, preferably from 1000 to 100,000 mPas, measured at 20° C., (B) from 10 to 50%, by weight, preferably from 10 to 30%, by weight, of at least one emulsifier polyester having a viscosity of from 2,000 to 200,000 mPas, preferably from 10,000 to 50,000 mPas, measured at 20° C., and containing, per 100 g:

(1) from 0.06 to 0.28 mols, preferably from 0.1 to 0.23 mols, of condensed units of an $\alpha$-$\beta$-mono-olefinically unsaturated dicarboxylic acid;

(2) from 0.04 to 0.34 mols, preferably from 0.1 to 0.2 mols, of benzyloxy groups; and (3) from 30 to 80%, by weight, preferably from 40 to 78%, by weight, based on the emulsifier polyester, of alkyleneoxy groups (-alkylene-O-);

the sum of (A) and (B) amounting to 100%;

(C) from 25 to 400%, by weight, preferably from 40 to 300%, by weight, of water; and (D) from 0 to 10%, by weight, preferably from 0 to 5%, by weight, of at least one conventional photoinitiator;

the percentage contents of (C) and (D), respectively, being based on the sum of (A) and (B).

The present emulsions are free of solvent and monomers. The term "free of monomers" means that the emulsions are free of monomers which may be copolymerised with components (A) and (B).

Acrylate prepolymers (A) within the context of the present invention are prepolymers which contain at least two (meth)acryloyloxy groups and which are derived from polyesters, polyethers, polyether polyesters, polyepoxides, aliphatic polyols, polyurethanes and vinyl polymers. Acrylate prepolymers of this type are known and are described, for example in U.S. Pat. Nos. 2,101,107; 2,413,973; 2,951,758; 3,066,112; 3,301,743; 3,368,900; 3,380,831; 3,455,801; 3,469,982; 3,485,732;

3,530,100; 3,551,246; 3,552,986; 3,628,963; 3,660,145; 3,664,861; 3,689,310; 3,719,521; 3,732,107; 3,782,961; 3,840,369; 3,888,830; 4,033,920; and 4,206,025; British Pat. Nos. 1,006,587; 1,241,823; 1,241,824; and 1,321,372 and in German Offenlegungsschrift Nos. 1,916,499 and 2,853,921.

Polyester acrylates and polyurethane acrylates are preferred acrylate prepolymers.

The following are particularly preferred polyester acrylates: polyesters containing (meth)acryloyloxy groups obtained from aliphatic dicarboxylic acids having from 4 to 10 carbon atoms and/or cycloaliphatic dicarboxylic acids having from 8 to 11 carbon atoms and/or aromatic dicarboxylic acids having from 8 to 10 carbon atoms, such as adipic acid, succinic acid, sebacic acid, hexahydrophthalic acid, terephthalic acid, o-, m-, p-benzene dicarboxylic acid, maleic acid, fumaric acid or derivatives thereof (for example anhydrides) and polyhydric aliphatic alcohols having from 2 to 6 carbon atoms and/or polyhydric aliphatic ether alcohols having from 4 to 16 carbon atoms, such as ethylene glycol, diethylene glycol, triethylene glycol, propane diols, dipropylene glycol, butane diols, hexane diol-1,6, neopentyl glycol, trimethylol propane, oxethylated trimethylol propane (having on average from 3 to 5 ethylene oxide units), pentaerythritol, oxethylated pentaerythritol and dipentaerythritol. The polyester acrylates are produced by conventional processes in one or more steps.

The following are particularly preferred polyurethane acrylates: polyaddition products from $\omega$-hydroxyalkyl(meth)acrylates having from 2 to 4 carbon atoms in the hydroxyalkyl radical, in particular $\beta$-hydroxyethyl(meth)acrylate, and aliphatic and/or cycloaliphatic and/or aromatic polyisocyanates, such as hexamethylene, isophorone, dicyclohexylmethane, diphenylmethane and toluylene diisocyanates, in particular hexamethylene diisocyanate and isophorone diisocyanate. The polyisocyanates are prepolymers containing in particular isocyanate groups (=urethane polyisocyanates) from the previously-mentioned diisocyanates which are used in excess and the polyhydric aliphatic alcohols and/or polyhydric aliphatic ether alcohols, as they are described above for the polyester acrylates. The urethane polyisocyanates may be produced, for example, according to U.S. Pat. No. 3,183,112.

The polyisocyanates which are used for polyaddition with the $\alpha$-hydroxy alkyl(meth)acrylates may also contain isocyanurate groups or biuret groups. They are derived in particular from hexamethylene diisocyanate or isophorone diisocyanate and may be obtained according to U.S. Pat. Nos. 3,919,218 or 3,124,605.

The $\alpha$-$\beta$-mono-olefinically unsaturated emulsifier polyesters (B) are polycondensation products of at least one $\alpha$-$\beta$-mono-olefinically unsaturated dicarboxylic acid usually having 4 or 5 carbon atoms, or ester-forming derivatives thereof (for example anhydrides), optionally in admixture with up to 100 mol %, based on the unsaturated acid component, of at least one aliphatic saturated dicarboxylic acid having from 4 to 10 carbon atoms or a cycloaliphatic or aromatic dicarboxylic acid having from 8 to 10 carbon atoms or ester-forming derivatives thereof (for example anhydrides), with at least one aliphatic dihydric polyether alcohol, optionally in admixture with at least one aliphatic trihydric polyether alcohol (up to 50 mol %, based on diol), and with at least one aliphatic polyhydric alcohol having n hydroxy groups (n=3 or 4, preferably 3), of which at least one and at most n-1 hydroxy groups are etherified with benzyl alcohol.

$\alpha$-$\beta$-mono-olefinically unsaturated dicarboxylic acids preferably include maleic acid, fumaric acid and itaconic acid. The following are mentioned as examples of aliphatic saturated dicarboxylic acids: succinic acid, adipic acid and subacic acid. The following are included as examples of cycloaliphatic and aromatic dicarboxylic acids: hexahydrophthalic acid, methyl hexahydrophthalic acid, tetrahydrophthalic acid, methyl tetrahydrophthalic acid, endomethylene tetrahydrophthalic acid, o-phthalic acid, isophthalic acid and terephthalic acid Polyalkylene glycols having from 2 to 4 carbon atoms in the alkylene moiety are preferred aliphatic dihydric polyether alcohols and, when trimethylene-oxy and/or butylene-oxy groups are present in the polyalkylene glycol, at least 50 mol % of ethylene-oxy groups, based on the total of mols of alkylene-oxy groups, should always be present. Polyethylene glycols are particularly preferred. The aliphatic trihydric polyether alcohols are preferably derived from trimethylolpropane and are preferably obtained in a known manner by oxalkylation with ethylene oxide. Examples of polyhydric alcohols containing benzyloxy groups include the following: trimethylolpropane monobenzyl ether, trimethylolpropane dibenzyl ether, pentaerythritol monobenzyl ether, pentaerythritol dibenzyl ether and pentaerythritol tribenzyl ether.

The emulsifier polyesters may be produced by known processes in one or more steps.

The acid number of the emulsifier polyesters (B) should generally be from 1 to 50, preferably from 5 to 40, mg/KOH per g of substance, and the OH numbers should generally be from 10 to 100, preferably from 10 to 80, mg/KOH per g or substance, and the molecular weights determined as a numerical average should be from 300 to 5000, preferably from 500 to 2000.

In order to protect the present coating agents from an undesirable premature polymerisation, it is advisable to add from 0.001 to 0.1%, by weight, of polymerisation inhibitors or antioxidants during the production of the acrylate prepolymers and the emulsifier polyesters. Suitable stabilizers are described in "Methoden der organischen Chemie" (Houben-Weyl), 4th edition, volume XIV/I, P. 433–452, 756; Georg-Thieme-Verlag, Stuttgart, 1961. For example, p-benzoquinone is particularly suitable in a concentration of from 0.01 to 0.05%, by weight, based on the total of the acrylate prepolymer and emulsifier polyester.

Suitable photoinitiators are described in the monograph by J. Kosar, Light-Sensitive Systems, J. Wiley & Sons, New York-London-Sydney, 1965.

Photoinitiators (D) which are preferred are the compounds which are usually used, for example, benzophenone, and very generally aromatic keto compounds which are derived from benzophenone, such as alkyl benzophenones, halo-methylated benzophenones according to German Offenlegungsschrift No. 1,949,010 (U.S. Pat. No. 3,686,084), anthrone, halogenated benzophenones optionally together with tertiary aliphatic amines and Michler's ketone. Anthraquinone and numerous derivatives thereof, for example $\beta$-methylanthraquinone, t-butylanthraquinone and anthraquinone carboxylic acid ester, also oxime esters according to German Offenlegungsschrift No. 1,795,089 are equally effective photoinitiators.

Benzoin and derivatives thereof are particularly preferred photoinitiators (see German Auslegeschrift No. 1,694,149, and German Offenlegungsschrift Nos. 1,769,168; 1,769,853; 1,769,854; 1,807,297 (U.S. Pat. No. 3,636,026); 1,807,301 (U.S. Pat. No. 3,824,284); and 1,919,678 (U.S. Pat. No. 3,732,273)).

The following are included as photoinitiators which are also particularly preferred: for example benzil ketals, such as benzil dimethyl ketal and hydroxy alkyl phenones, for example 2-hydroxy-2-methyl-1-phenyl-propan-1-one.

The emulsions according to the present invention may be produced by stirring the water (C) into the mixture of (A)+(B), for example by simply stirring or by means of dissolvers.

In order to produce a finely-divided emulsion, i.e. to increase the effect of the shearing forces, it is advantageous to add water in portions at a temperature below 30° C. When there is optimum shearing, oil-in-water emulsions are formed.

The photoinitiator (D) may be added to the mixture of (A)+(B) before emulsifying or, if there is adequate water solubility, may be added to the emulsion.

In order to protect photosensitive substrates for example light-coloured woods, small quantities of conventional UV absorbers may be added to the coating compositions, for example 2-hydroxy-4-methoxy-benzophenone, or cinnamic acid and benzotriazine derivatives which are conventionally used, may be added.

Conventional additives and dyes, preservation, matting and flow agents and pigments may also be added to achieve particular effects, as long as they do not fundamentally influence the emulsion stability and the polymerisation.

The emulsions according to the present invention are outstandingly suitable for processing on conventional lacquering apparatus which are equipped with casting machines. Furthermore, they may be applied by rolling and spraying. Wood and wood-like products, for example veneer-imitation films are preferred substrates.

Hardening is effected using ionising, for example high-energy electron radiation or, in the presence of photoinitiators, UV radiation, advantageously only after the lacquer film has released water. The film is usually formed over a short period of time, without heat having to be supplied, by the release of water, in layer thicknesses which are conventional for lacquers (from 10 to 200 μm dry layer thickness). If required, the film may also be formed at a temperature of up to 100° C.

The following Examples illustrate the present invention. The percentages are based on weight. The viscosity was measured in a Höppler falling ball viscosimeter (DIN 53 015) at 20° C.

Production of the starting materials

Acrylate prepolymer A1

91 g of adipic acid, 55 g of phthalic acid anhydride, 100 g of trimethylolpropane, 62 g of ethylene glycol and 66 g of 2-ethyl caproic acid are esterified in a melt condensation at 190° C. under an inert gas atmosphere, until the acid number (AN) is below 10. This number was 7.4 and the OH number was 300 mg KOH/g of substance. After adding 86 g of acrylic acid, 0.25 g of hydroquinone, 3 g of p-toluene sulphonic acid and 175 g of toluene, the mixture is further esterified azeotropically at from 100° to 120° C. while passing air through. After distilling off the toluene under vacuum, the prepolymer has a viscosity of 18,500 mPa.s. The AN is 8 and the OH number is 80 mg KOH/g of substance.

Acrylate prepolymer A2

An OH group-containing partial ester which also contains acryloyloxy groups is first of all produced by azeotropically esterifying an oxethylated trimethylolpropane [OH number 550 (mg KOH/g of substance), degree of oxethylation about 4] with acrylic acid.

925 g of oxethylated trimethylolpropane are heated to reflux with 430 g of acrylic acid, 12 g of p-toluene sulphonic acid, 1 g of p-methoxy-phenol, 1.2 g of di-t-butyl-hydroquinone and 280 g of toluene while passing air through, and the water produced by the reaction is removed azeotropically. After reaching an acid number below 3 (mg KOH/g of substance), the solvent is removed under vacuum and the product is subjected to clearing filtration. An ethylenically unsaturated partial ester containing OH groups is obtained which has the following characteristic data:

Iodine colour number: 0-1
Acid number: 2
OH number: 115

The partial ester containing acryloyloxy groups which is obtained above is then reacted with 2,4-toluylene diisocyanate to produce the acrylate prepolymer A2.

174 g of 2,4-toluylene diisocyanate and 0.7 g of p-methoxy-phenol are introduced into a stirrer-equipped apparatus, with dry air being passed over, and are heated to from 40° to 65° C.

980 g of the partial ester containing OH groups and acryloyloxy groups are added over a period of about 2 hours and the mixture is stirred at the specified temperature until the NCO value amounts to less than 0.1%.

The viscosity of the acrylate prepolymer A2 is 46,000 mPa.s.

Emulsifier polyester B1

199 g of maleic acid anhydride, 609 g of polyethylene glycol (MW 400) and 228 g of trimethylolpropane monobenzyl ether are subjected to melt condensation at 190° C. under a stream of N₂.Acid number 8, OH number 63. Viscosity 40,000 mPa.s.

Emulsifier polyester B2

175 g of maleic acid anhydride, 643 g of polyethylene glycol (MW 400) and 214 g of trimethylolpropane dibenzyl ether are condensed as described under B1 to an acid number of 7. The OH number is 36 and the viscosity is 20,500 mPa.s.

EXAMPLES

To produce the emulsions of the present invention, 200 g each of acrylate prepolymer A1 and A2 are mixed with 50 g of emulsifier polyester B1 and B2, respectively, and with each 5 g of photoinitiator benzyl dimethyl ketal, sheared with in each case 110 g of water in the dissolver at 8000 r.p.m., and then adjusted with water to 50% solids content with stirring (1,000 r.p.m.). Oil-in-water emulsions are produced.

| Example | 1 | 2 |
| --- | --- | --- |
| Acrylate prepolymer | A1 | A2 |
| Emulsifier polyester | B1 | B2 |
| Viscosity mPas | 55 | 68 |

| Example | 1 | 2 |
| --- | --- | --- |
| Particle size nm | 300–600 | 250–500 |

The emulsions may be cast on the casting machines which are conventional for coating wood, without fault and without the formation of a skin or "stalactites" at the points which are particularly exposed to a draught, such as the storage container and casting lips. An application of 70 g/m$^2$ hardens under IST radiators (pulse radiators manufactured by Strahlentechnik Hildebrand, Werner and Pfleiderer, 80 watts/cm radiator length, distance 20 cm) at 8 m/min processing rate to produce perfectly waterproof lacquer films.

We claim:

1. An aqueous radiation-hardenable emulsion which comprises:
   (A) from 90 to 50%, by weight, of at least one acrylate prepolymer containing, per 100 g, from 0.2 to 0.65 mols of (meth)acryloyloxy groups and having a viscosity (20° C.) of from 500 to 300,000 mPas;
   (B) from 10 to 50%, by weight, of at least one emulsifier polyester having a viscosity (20° C.) of from 2000 to 200,000 mPas and containing, per 100 g:
      (1) from 0.06 to 0.28 mols of condensed units of at least one $\alpha,\beta$-mono-olefinically unsaturated dicarboxylic acid;
      (2) from 0.04 to 0.34 mols of benzyloxy groups; and
      (3) from 30 to 80%, by weight, based on (B), of alkylene-oxy groups;
   the sum of (A) and (B) amounting to 100%;
   (C) from 25 to 400%, by weight, of water; and
   (D) from 0 to 10%, by weight, of at least one photoinitiator;
   the contents of (C) and (D) being based on the sum of (A) and (B).

2. An emulsion as claimed in claim 1 comprising:
   (A) from 90 to 70%, by weight, of at least one acrylate prepolymer containing, per 100 g, from 0.3 to 0.55 mols of (meth)acryloyloxy groups and having a viscosity (20° C.) of from 1000 to 100,000 mPas;
   (B) from 10 to 30%, by weight, of at least one emulsifier polyester having a viscosity (20° C.) of from 10,000 to 50,000 mPas and containing, per 100 g;
      (1) from 0.1 to 0.23 mols of condensed units of at least one $\alpha,\beta$-mono-olefinically unsaturated dicarboxylic acid;
      (2) from 0.1 to 0.2 mols of benzyloxy groups; and
      (3) from 40 to 78%, by weight, of alkylene-oxy groups;
   (C) from 40 to 300%, by weight, of water; and
   (D) from 0 to 5%, by weight, of at least one photoinitiator.

3. A process for the production of a coating on a substrate which comprises applying an emulsion as claimed in claim 1 to a substrate and hardening the the emulsion by the action of radiation.

4. A process as claimed in claim 3 in which the substrate is wood or a veneer-imitation film.

* * * * *